Oct. 30, 1923.

R. F. PFAU

DIRECTION SIGNAL

Filed July 24, 1922

R. F. Pfau
INVENTOR

BY Victor J. Evans
ATTORNEY

WITNESS:

Oct. 30, 1923.

R. F. PFAU 1,472,671

DIRECTION SIGNAL

Filed July 24, 1922

R. F. Pfau
INVENTOR
BY Victor J. Evans
ATTORNEY

WITNESS:

Oct. 30, 1923.

R. F. PFAU

DIRECTION SIGNAL

Filed July 24, 1922

R. F. Pfau
INVENTOR

BY Victor J. Evans
ATTORNEY

WITNESS:

Patented Oct. 30, 1923.

1,472,671

UNITED STATES PATENT OFFICE.

ROBERT F. PFAU, OF WILLMAR, MINNESOTA.

DIRECTION SIGNAL.

Application filed July 24, 1922. Serial No. 577,150.

*To all whom it may concern:*

Be it known that I, ROBERT F. PFAU, a citizen of the United States, residing at Willmar, in the county of Kandiyohi and State of Minnesota, have invented new and useful Improvements in Direction Signals, of which the following is a specification.

This invention relates to a directional signal for motor vehicles, the general object of the invention being to provide means for indicating the intentions of the driver so that the drivers of vehicles in the rear will be cautioned that the car ahead is to change its direction or its speed.

Another object of the invention is to provide means whereby the device can be used during the day as well as at night.

The invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1:
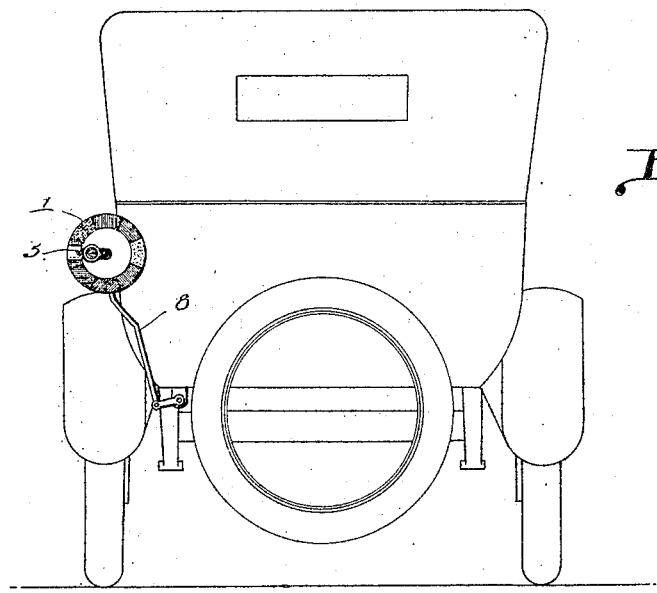
Figure 1 is a view of the rear part of an automobile showing my invention in use.
Figure 2:
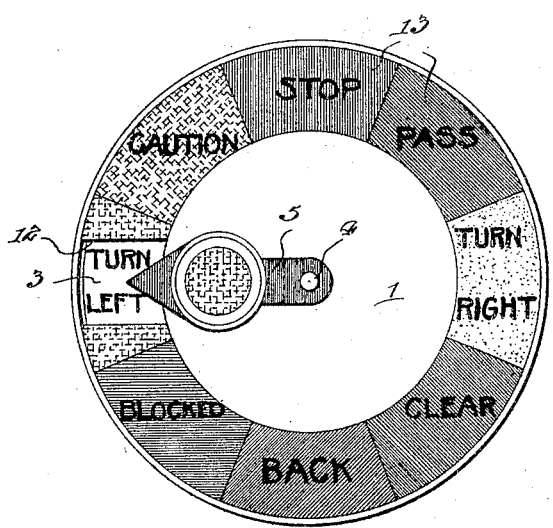
Figure 2 is an enlarged front view of the device itself.
Figure 3:
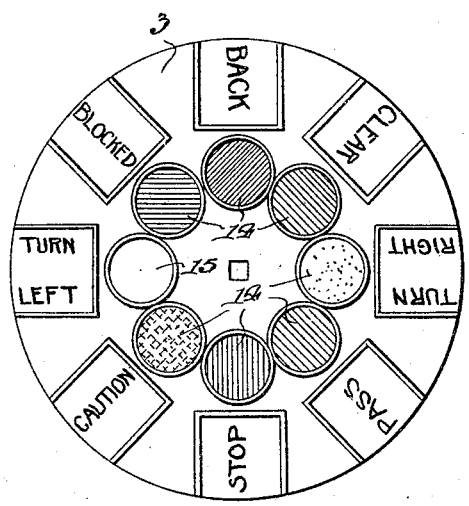
Figure 3 is a view of the dial.
Figure 4:
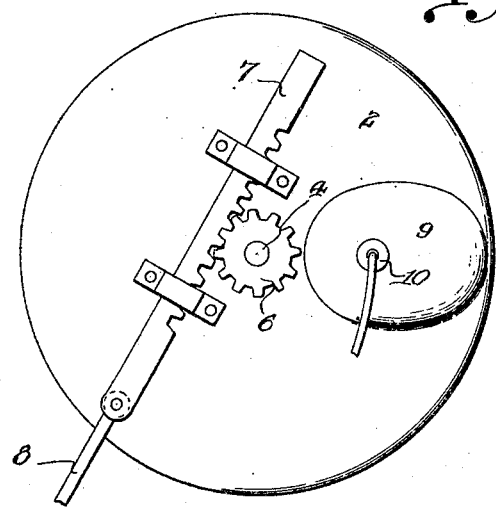
Figure 4 is a rear elevation.
Figure 5:
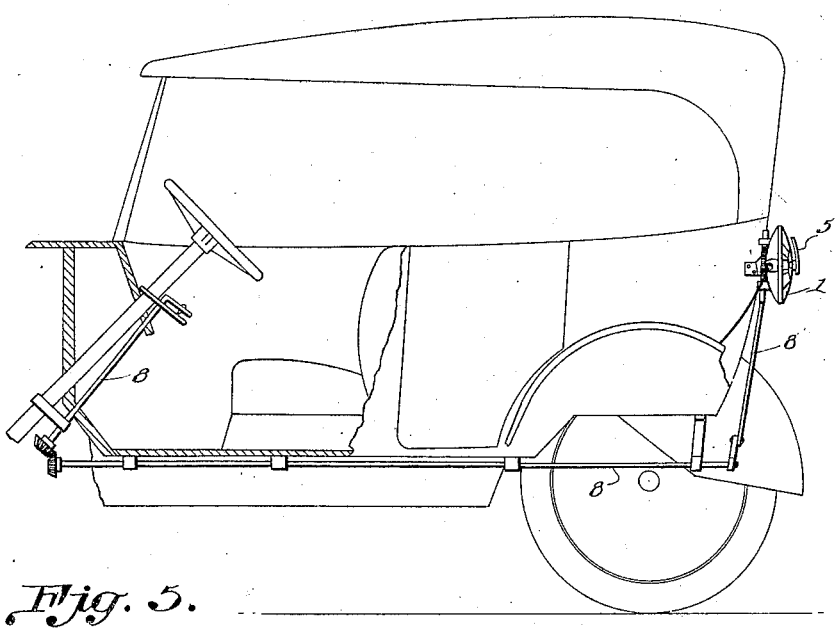
Figure 5 is a side view of the automobile showing how the device is operated from the driver's seat.
Figure 6:
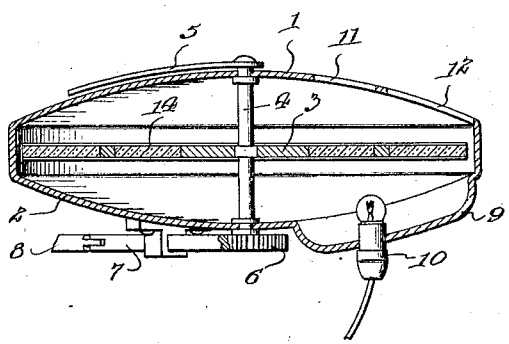
Figure 6 is a transverse sectional view through the device.

In these views, 1 indicates the outer member or dial which has its edges integrally connected with the edges of the rear member 2 so as to form a casing for receiving the inner member or dial 3, which is carried by the shaft 4, arranged to rotate in the casing. The shaft passes through the casing and its front end carries the pointer 5 and to its rear end is secured the pinion 6. Secured to the back of the rear member and slidably mounted thereon there is a rack bar 7 which is suitably supported and is reciprocated by the connections 8. The connections lead to the front of the vehicle as shown in Figure 5 of the drawings so that the device can be operated by the driver of the vehicle. As the pointer and dial 3 are secured to the shaft they will be rotated in unison by the shaft. The rear member is formed with a reflector 9 and has a socket for an electric lamp 10 which is supplied with current from any suitable source. The outer member 1 is provided with a circular opening 11 which is placed at one side of the center and with an opening 12 which is located near the edge of the casing. The periphery of this member is divided into spaces 13 which contain different words and which are differently colored. For instance, one space is colored orange and contains the word "Caution," the next space is red and has the word "Stop" therein, the next one is green and contains the word "Pass," the next is gray and contains the words "Turn right," the next is green and contains the word "Clear," the next is purple and contains the word "Back" and the next is blue and contains the word "Blocked." Adjacent the opening 12 the member is colored yellow.

The inner dial or member 3 contains a plurality of lenses 14 which will register with the circular opening 11 during the rotation of the member and as the opening 11 is in front of the lamp the rays thereof will pass through the lens 14 which is in register with the opening 11 and through said opening so that the color of the lens can be seen by the drivers behind. These lenses are colored with the same colors as the spaces on the front of the casing are colored with, except one, which is of clear glass as this color is carried by a lens 15 on the pointer which will be over the opening 11 when the vehicle is to be turned to the left, thus the proper color will be signalled. This inner dial also has spaces of clear glass at its periphery which are opposite the lenses and these spaces contain the words which are duplicates of those on the outer dial and these words on the inner dial are arranged opposite the lenses 14 which correspond in color with the color of the spaces on the outer dial which contain the same words. These spaces will register with the opening 12 while the lenses 14 are registering with the opening 11. Thus, it will be seen, a certain warning word is associated with a certain color both on the outer dial and on the inner dial, the color and word appearing through the openings in the outer dial when the lamp is lighted and the pointer indicating the proper word and color on the outer dial for use during the day.

From the foregoing it will be seen that a plurality of warning signals can be given with this device so that the drivers in the rear will know just what the car in front is going to do. As will also be seen both the warning color and the word are illuminated as they appear at the openings in the outer member. This device will reduce accidents to a minimum as it makes use of a number of colors and is not confined to red which is used in so many other situations that confusion might exist as to just what is meant and whether or not it is on a vehicle.

It is thought from the foregoing description that the novel features and the advantages of my invention will be apparent.

I desire it to be understood that I may make changes in the construction and in the combination and arrangement of the several parts, provided that such changes fall within the scope of the appended claim.

Having thus described my invention what I claim as new is:—

A signal of the class described comprising a casing having a pair of openings therein, a dial on the face of the casing having warning symbols thereon, a rotary member in the casing having colors and symbols thereon for appearing at the openings, a pointer associated with the dial, means for moving the rotary member and the pointer simultaneously so that the pointer will indicate the same symbol as appears in the opening and means for illuminating the warnings on the rotary member.

In testimony whereof I affix my signature.

ROBERT F. PFAU.